United States Patent [19]
Kant

[11] 3,801,840
[45] Apr. 2, 1974

[54] METHOD AND APPARATUS FOR REGULATING THE SPEED OF AN ASYNCHRONOUS ELECTROMAGNETIC MACHINE HAVING AN OPEN MAGNETIC CIRCUIT

[75] Inventor: Michel Kant, Paris, France

[73] Assignee: Agence Nationale de Valorisation de la Recherche Anvar, Paris, France

[22] Filed: Feb. 7, 1972

[21] Appl. No.: 223,917

[30] Foreign Application Priority Data
Feb. 8, 1971 France .............................. 71.04086

[52] U.S. Cl. ................................................. 310/13
[51] Int. Cl. ........................................... H02k 41/02
[58] Field of Search .......... 310/13; 318/197, 220 R, 318/225 R

[56] References Cited
UNITED STATES PATENTS

| | | | |
|---|---|---|---|
| 2,664,534 | 12/1953 | Noodleman et al. | 318/225 R |
| 2,825,018 | 2/1958 | Diamond | 318/225 R |
| 2,991,402 | 7/1961 | Imada et al. | 318/220 R |
| 3,584,277 | 6/1971 | Teddoresgu | 318/225 R |
| 3,622,818 | 11/1971 | Payen | 310/13 |
| 3,663,844 | 5/1972 | Kant et al. | 310/13 |

*Primary Examiner*—Gene Z. Rubinson
*Attorney, Agent, or Firm*—Brisebois & Kruger

[57] ABSTRACT

Asynchronous electromagnetic machine having an open magnetic circuit has a supplementary winding at each end of its field winding and the phase of the current supplied to these supplementary windings is varied to produce a variable difference between the phase in said supplementary windings and one of the phases in the main field winding.

11 Claims, 3 Drawing Figures

METHOD AND APPARATUS FOR REGULATING THE SPEED OF AN ASYNCHRONOUS ELECTROMAGNETIC MACHINE HAVING AN OPEN MAGNETIC CIRCUIT

This invention relates to a method of regulating the speed of translation of the armature in an asynchronous induction machine having an open magnetic circuit with respect to its field winding, and to a machine utilizing said method. The present invention relates particularly to linear induction machines, magnetohydrodynamic induction machines and rotating asynchronous machines in which the magnetic inductive circuit is open, such as arc motors.

The invention also relates to rotary asynchronous machines in which the cylindrical magnetic circuit is interrupted at several points due to local saturation.

One known method of varying the speed of an asynchronous machine consists in introducing resistance into the rotor circuit. This method has the disadvantage of causing substantial losses due to the Joule effect.

Another known method of varying the speed of an asynchronous machine consists in regulating the frequency of the voltage supplying the field winding. This method has the disadvantage of requiring the use of an inverter, which may be expensive and complex.

In another known type of polyphase induction machine the speed is varied by changing the pole pitch by means of regulating windings superposed in a large number of slots in the field winding. By regulating the supply to the regulating windings which extend the full length of the field winding, a variation in pole pitch is obtained by superposition of phase differences in each slot.

A process of this type requires a large number of windings superposed in each slot if several different speeds are desired, which is technically difficult, not to say impossible, to provide in practice.

Moreover, it is necessary to provide an extremely complex phase shifting device for supplying the regulating windings.

The method according to the invention permits the speed to be changed without encountering these disadvantages. In this method a substantial range of speeds is provided without using an inverter, and the method requires only a simple and inexpensive phase shifter. Moreover, the method according to the invention makes it possible to obtain a high efficiency.

The method of regulating the speed of relative movement of the armature with respect to the field winding of an asynchronous machine having an open magnetic circuit supplied with alternating polyphase current in accordance with the invention is characterized by the fact that the speed is regulated by creating at the ends of the field winding a phase difference which reflects the parasitic waves and modifies the frequency and amplitude of the field over the entire length of the machine.

In accordance with the invention, a current which is out of phase with respect to one of the phases of the supply current is introduced into at least two excitation windings mounted at the ends of the field winding on the magnetic frame in order to create a pulsing field which is strictly localized at the ends of the magnetic circuit.

For each value of phase difference, this results in the amplification of a particular parasitic frequency which becomes preponderant and results in a modification of the operating speed of the machine. In other words, the presence of the supplementary end windings makes it possible to reflect the waves of certain frequencies in proportion to the amount of phase difference.

In practice, the phase difference is produced by one or more phase shifters of a conventional type which may be, for example, rotary field transformers. It will thus be seen that the process according to the invention is particularly simple to carry out and that it does not require the use of inverters or phase shifters of a special type. These phase shifters are usually supplied from the main power source, and may also be supplied from a low power source at a frequency different from that of the main source.

If the number of waves over the total length of the inductor is substantial, it is possible to provide on the linear machine additional excitation windings analogous to the aforementioned end windings and wound in the same manner. The effect of the reflection of the parasitic waves is thus produced over the entire length of the field winding. In another embodiment utilizing the process according to the invention, as asynchronous machine having an open magnetic circuit is used which has two field windings which may be supplied with alternating current. The first winding is optimized for operation at a constant speed, for example by a particular configuration of the winding which makes it possible to suppress longitudinal distortion of the magnetic field in the magnetic gap. The second field winding is provided with at least two end windings, analogous to those previously described, which permit regulation of the speed by introducing an out-of-phase current as previously set forth. This produces not only a substantial range of speeds, but also an excellent efficiency at normal speed, since it is possible to connect sometimes one, sometimes the other of the field windings.

In another embodiment utilizing the method according to the invention, the asynchronous machine having an open magnetic circuit has a single reversible field winding provided with two end windings similar to those previously described. One connection of the field winding produces the configuration necessary to regulate the speed and the other connection produces the configuration which is optimum for the operation at constant speed. This permits, as before, by choice of the correct connection, the provision of a large range of speeds according to the invention, while retaining the advantage of optimum efficiency at constant speed.

In another embodiment utilizing the method according to the invention, an asynchronous machine having an open magnetic circuit is used which comprises two field windings having a different number of poles. This results in a larger number of parasitic frequencies which makes it possible to still further increase the range of possible speeds which may be attained by using the method of speed regulation according to the invention. In this latter case, however, the efficiency is less than that of a machine with two identical field windings. As before, it is possible to provide a third winding optimized for operation at constant speeds.

In another embodiment utilizing the method according to the invention, a machine having an open magnetic circuit is provided with two field windings having a different pole pitch and thus different field speeds. One of the windings, that is to say the principal winding, is provided with at least two end windings. The pole pitch of the other winding is so calculated that the synchronous speed of its field is equal to the mechanical speed of the armature during continuous operation. This winding is effective only during speed regulation, when it serves two purposes. It imposes, conjointly with the principal winding, a predetermined shape on the magnetic field, and affects the strength of the field at the ends of the magnetic circuit, thus increasing the effect of the end windings. It should be noted that these windings at two different pole pitchs may also be used during operation at constant speed to impose an optimum shape on the magnetic field in the machine (for example a purely sliding shape free of parasitic waves).

The asynchronous machine having an open magnetic circuit according to the present invention, which may be of the basic type described in my prior U.S. Pat. No. 3,663,844, has one or more field windings which are supplied with alternating current. Each field winding is provided with at least two end windings wound around the magnetic frame so as to create a pulsating magnetic field which is strictly localized at the ends of the magnetic circuit and is supplied with a current which is out of phase with respect to one of the phases of the supply current, which results in a variation in the slip between the armature and field winding in accordance with the method according to the invention.

The invention will be better understood from a study of the following examples which are given purely by way of illustration.

The attached drawings show, by way of example possible embodiments of the exciting winding and the connections of a linear machine utilizing the method of speed regulation according to the invention. On these drawings.

Figure 1:
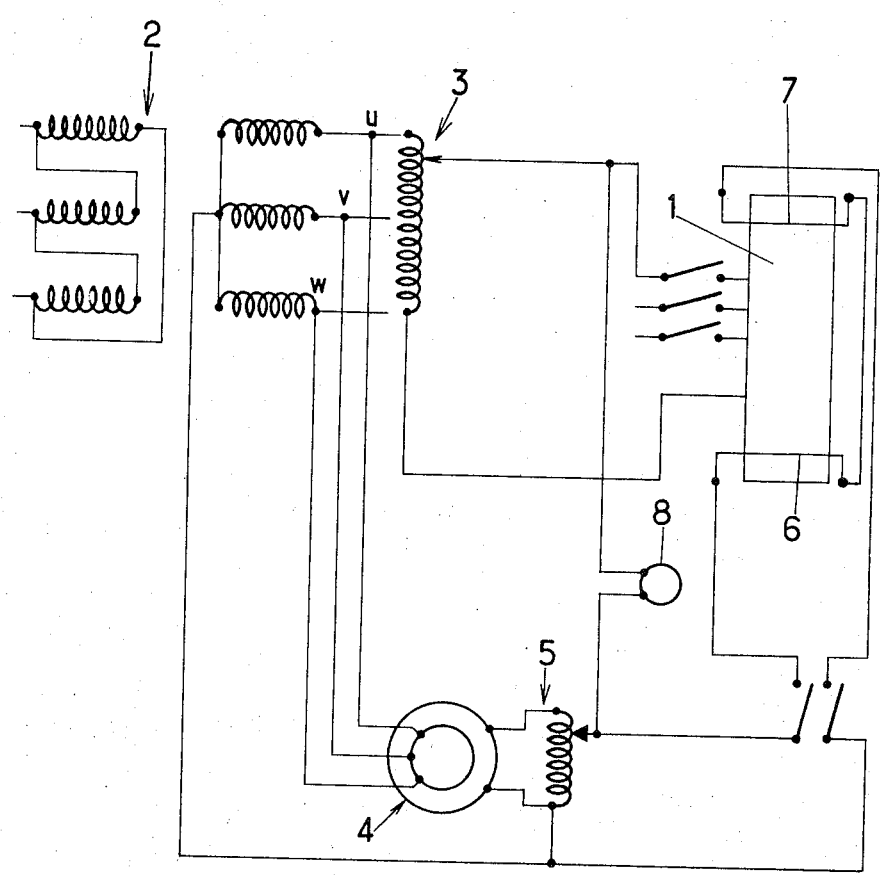
FIG. 1 is a circuit diagram showing the first phase, as well as the phase shifter, with the connections of the two other phases omitted, since they are identical to those of the first phase.

Referring now to FIG. 1, it will be seen that the linear induction machine 1, the field winding of which is schematically shown, is supplied with three-phase alternating current by the three-phase transformer 2 through the variable auto-transformer 3. The phase shifter 4 supplying the variable auto transformer 5, makes it possible to vary the speed by introducing into the end windings 6 and 7 a current at a variable difference in phase from the main phase 1, the amount of which phase difference may be measured by the phase meter 8. It will be seen from the figure that the end windings 6 and 7 are wound around the magnetic frame and form part of the ends of the magnetic circuit. These windings 6 and 7 are thus capable, when supplied by the phase shifter 4, of reflecting the parasitic waves of certain frequencies, thus leading to a variation in the speed of the armature with respect to the field winding.

Figure 2:
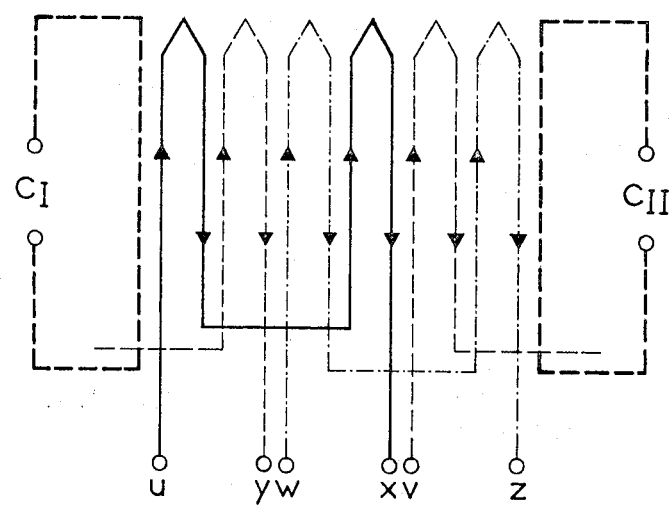
FIG. 2 shows a particular winding for a four pole motor.
Figure 3:
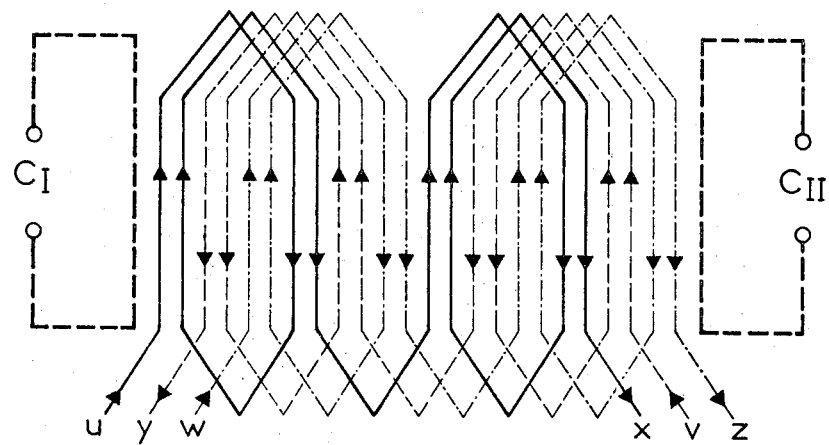
FIG. 3 shows another winding for a four pole motor.

FIGS. 2 and 3 each show a particular winding for a four pole machine. The inputs of the three phases have been assigned reference characters U, V, and W, while the outputs have been assigned reference characters X, Y, and Z. The end windings in which the current lagging one of the phases is introduced are $C_1$ and $C_2$. The windings shown on FIG. 2 have a certain number of technological advantages over the windings normally used for linear induction machines which are, for example, of the type shown on FIG. 3. In the windings shown on FIG. 2 the conductive wires are less sharply turned, which makes it possible to use thicker copper bars.

Applicant has constructed a test linear induction motor and the characteristics and performance of this motor will now be described.

EXAMPLE 1

The linear machine used comprises two linear stators made of sheet metal each having 36 open slots. The length of each stator is 655 mm; its width is 60 mm; and its height 97 mm. The winding used was a three-phase winding having four slots per pole and per phase. The windings were identical on the two stators. Each stator also had two end windings. The winding was for tripolar.

The armature consisted of an endless strip made of a conductive material. The nominal voltage varied between 220 and 380 volts, the frequency being 50 kc. The nominal current was 25 amperes and the power factor, $\cos \theta$, may vary from 0.3 to 0.5. The optimum revolution slip is from 0.4 to 0.6. The synchronous speed is 21.8 meters per second. The phase shifter utilized is a rotary field transformer and the following results are obtained: For a lag between phase I and the end windings ranging from zero to 300° the variation in speed is from 4 to 14 meters per second. For a particularly economic range in which the efficiency is practically constant as compared to the nominal efficiency, a lag of 100° to 180° results in a variation in speed of from 6 to 12 meters per second.

EXAMPLE 2

The physical characteristics of the linear machine used are the same as those in Example 1, as well as the characteristics of the supply current. However, in this example, one of the stators used has four poles and the other stator used has three poles. The results obtained are as follows: With the upper stator lagging phase I by from 0° to 300°, and the lower stator lagging phase I by 80° to 220°, a variation in speed of from 2 to 15 meters per second is obtained. For a particularly economical regulation in which the efficiency is practically the same as the nominal efficiency a range in speed of from 6 to 12 meters per second is obtained.

It must nevertheless be noted that, in this case, the efficiency remains less than 30 to 40 percent of that of the three pole motor of Example 1.

It will thus be seen that, as a consequence of the method of varying the speed according to the invention, it is possible to obtain a substantial range of speeds by utilizing the phase difference produced by a rotating field transformer which has the advantage of being both simpler and cheaper than the conventional inverter ordinarily used to vary the frequency of the supply current and thus vary the speed of the machine. The process according to the invention is particularly useful in obtaining a range of speeds with good efficiency, since it utilizes the parasitic components of the field to produce the desired variation in speed. Finally, by combining in a single machine a winding intended for use at normal speeds and a winding intended to regulate the speed, a linear induction machine is obtained which always operates at its maximum efficiency. The process of regulating the speed according to the invention may be used in simple induction machines or in multiple induction machines regardless of the positions of the field windings with respect to the armature.

What is claimed:

1. In an asynchronous electrical machine having an open magnetic circuit, an armature, and at least one stator comprising a main field winding having two separate ends, said main field winding being connected to induce an electrical field in said armature when said field winding is supplied with an alternating polyphase current, said armature and stator being mounted for relative movement, the improved means for regulating the speed of said relative movement which comprises at least two supplementary windings on said stator, one adjacent each of said separate ends of said main field winding, which supplementary windings create a localized alternating field in said ends of said main field winding when said supplementary windings are also supplied with an alternating current, and means for producing a variable difference between the phase of the current supplied to said main field winding and the phase of the current supplied to said supplementary field windings.

2. Machine as claimed in claim 1 comprising a second main field winding optimized for operation at a constant speed and connected to be supplied with an alternating polyphase current in the absence of supply to said first mentioned main field winding and said supplementary windings.

3. Asynchronous machine as claimed in claim 1 comprising reversible input and output connections to said main field winding.

4. Asynchronous machine as claimed in claim 1 comprising a second field winding having a different number of poles from said main field winding.

5. Asynchronous machine as claimed in claim 1 which has a second field winding having a different pole pitch from that of said main field winding.

6. Asynchronous machine as claimed in claim 5 in which the pole pitch of one of the field windings is such that the electrical speed of the magnetic field induced by that winding is equal to the mechanical speed of the armature with respect to the field winding during operation of the machine at constant speed.

7. Apparatus as claimed in claim 1 which comprises at least one adjustable phase shifter connected to the supplementary windings.

8. Apparatus as claimed in claim 7 in which said phase shifter is connected to one of the phases of the field winding.

9. Apparatus as claimed in claim 7 in which said phase shifter is connected to an auxiliary power source which supplies current at a power lower than that at which the field winding is supplied.

10. Device as claimed in claim 9 in which said auxiliary power source is adapted to supply power at a variable frequency.

11. Method of regulating the speed of displacement of the armature with respect to the field winding of an asynchronous machine having an open magnetic circuit, said field winding having two separate ends and said machine also comprising at least two supplementary windings one at each end of said field winding, which method comprises the step of supplying said supplementary windings with a current which is out of phase with respect to one of the phases of the current supplied in said main field winding and creates a localized alternating field in the ends of said main winding and regulating the phase difference between said currents and the frequency of the current to said supplementary windings to obtain the desired speed.

* * * * *